H. C. HEBIG.
SHOCK ABSORBER FOR VEHICLES.
APPLICATION FILED FEB. 18, 1913.
1,210,645.
Patented Jan. 2, 1917.
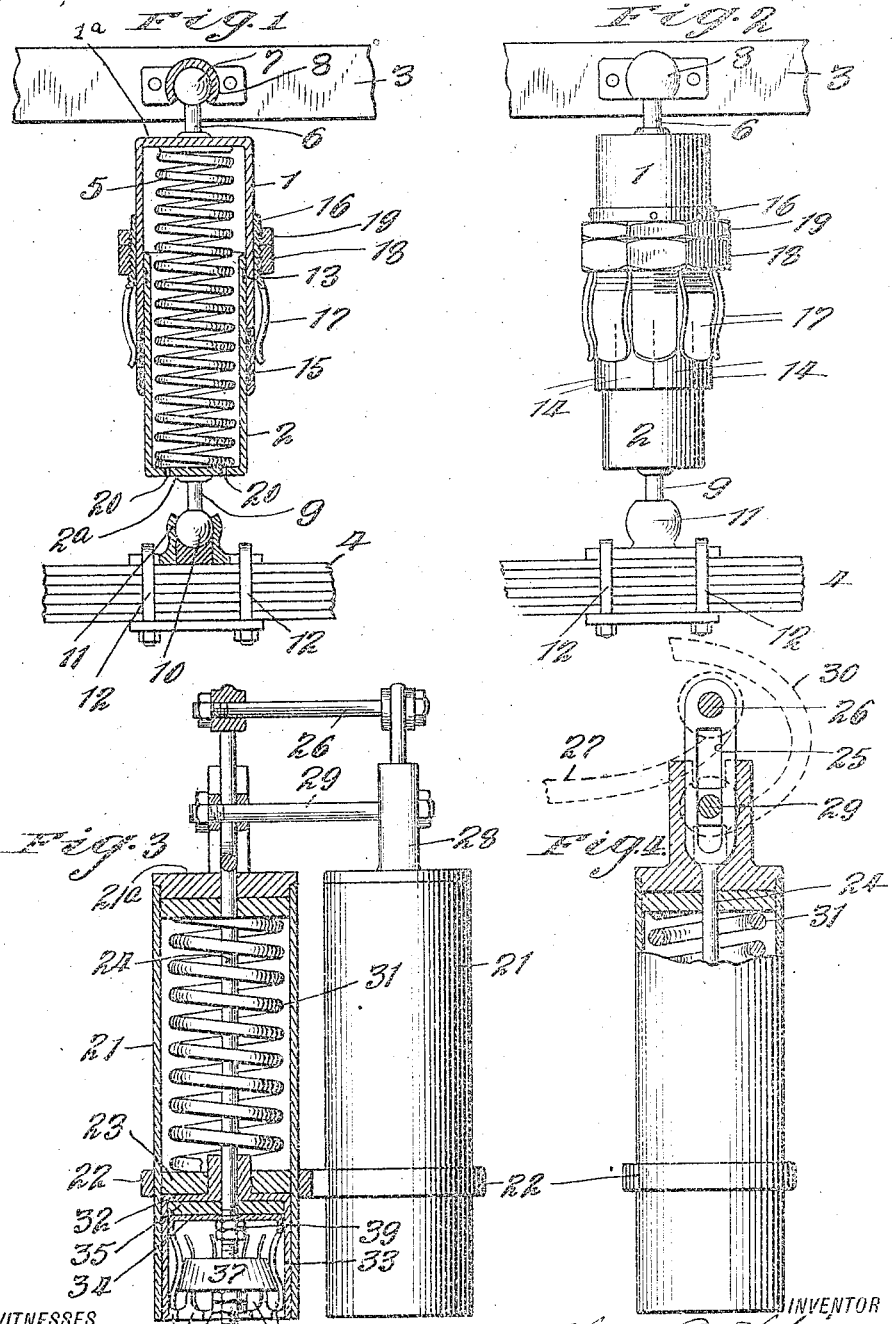

UNITED STATES PATENT OFFICE.

HENRY C. HEBIG, OF NEW YORK, N. Y., ASSIGNOR TO WILLIAM P. HAMMOND, OF PASSAIC, NEW JERSEY.

SHOCK-ABSORBER FOR VEHICLES.

1,210,645.

Specification of Letters Patent.

Patented Jan. 2, 1917.

Application filed February 18, 1913. Serial No. 749,110.

*To all whom it may concern:*

Be it known that I, HENRY C. HEBIG, a citizen of the United States, and a resident of the city of New York, borough of Manhattan, in the county and State of New York, have invented certain new and useful Improvements in Shock-Absorbers for Vehicles, of which the following is a full, clear, and exact description.

The present invention relates to certain new and useful improvements in shock absorbers such as are adapted to be employed in connection with automobiles and other vehicles for the purpose of absorbing the shocks and preventing excessive rebound when the vehicle is passing over a rough road.

The object of the invention is to provide a shock absorber of this character which is comparatively simple and inexpensive in its construction, which can be readily applied to the vehicle, and which embodies novel features of construction whereby it will operate in an effective manner to absorb sudden shocks and jars and prevent excessive rebounding of the vehicle body.

A further object of the invention is to provide a shock absorber which embodies novel features of construction whereby the resistance thereof to the rebound of the vehicle body can be readily adjusted as may be found necessary.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a vertical sectional view through a shock absorber constructed in accordance with the invention. Fig. 2 is a side elevation of the same. Fig. 3 is a side elevation of a modified form of the shock absorber, portions being broken away and shown in section to more clearly illustrate the construction thereof, and Fig. 4 is an end view of the modified form of shock absorber, portions being broken away and shown in section.

Corresponding and like parts are referred to in the following description and indicated in all the views of the drawings by the same reference characters.

Specifically describing the embodiment of the invention illustrated by Figs. 1 and 2, the numerals 1 and 2 designate a pair of telescoping members, the member 1 being connected to a part 3 of the vehicle which is movable with the body thereof, while the member 2 is connected to a part 4 of the vehicle which is substantially rigid with the running gear. The two members 1 and 2 are hollow in construction and substantially cylindrical in shape, the open end of the member 2 being received and slidably mounted within the open end of the member 1. A coil spring 5 is mounted within the hollow telescoping members 1 and 2, the upper end of the coil spring bearing against the head $1^a$ which closes the upper end of the telescoping member 1, while the lower end of the coil spring bears against the head $2^a$ which closes the lower end of the member 2. This spring tends to force the members 1 and 2 apart and is placed under compression when the vehicle body is moved downwardly toward the running gear.

For the purpose of enabling the shock absorber to be readily mounted in position upon the vehicle, the closed end $1^a$ of the member 1 is provided with a stem 6 which terminates in a ball 7, the said ball being loosely received within a socket 8 which is adapted to be permanently connected to the vehicle part 3. In a similar manner the closed lower end $2^a$ of the telescoping member 2 is provided with a stem 9 terminating in a ball 10 which is loosely received within a socket 11 adapted to be permanently connected in any suitable manner as by means of the clamps 12 to the vehicle part 4.

The upper end of the telescoping member 2 is provided upon the exterior thereof with an annular groove or recess within which suitable packing 13 is arranged, the said packing being adapted to frictionally engage the interior of the member 1. It will also be observed that the lower end of the member 1 is formed with a series of spring arms 14 which serve to frictionally engage the exterior of the member 2 for the purpose of retarding the telescopic movement of the members. These spring arms 14 may be conveniently formed by longitudinally slitting the free end of the member 1, and the inner faces of the spring arms are recessed to receive suitable packing 15 which frictionally bears against the member 2. A collar 16 is applied to the exterior of the telescoping member 1 and riveted or otherwise permanently secured thereto, the said collar being provided with a series of downwardly extending spring fingers 17 which bear against the spring arms 14 of the member 1 and tend to force the said spring arms inwardly into operative position. These spring fingers 15 are preferably arranged alternately with respect to the spring arms 14, as indicated more clearly by Fig. 2, and intermediate portions of the said spring fingers 15 are bowed outwardly. The exterior of the collar 16 and also the upper ends of the spring fingers 17 are threaded for the reception of an adjusting nut 18. By screwing this adjusting nut 18 downwardly into engagement with the outwardly bowed portions of the spring fingers 17, the tension of the spring fingers can be increased, so that the spring fingers will bear with greater force upon the spring arms 14 and cause the said spring arms 14 to produce a more effective frictional engagement with the telescoping member 2. A jam nut 19 may also be threaded upon the collar 16 for locking the adjusting nut 18 against movement after it has once been set to produce the desired tension in the spring fingers 17. The frictional resistance to the telescoping movement of the members 1 and 2 can thus be adjusted as may be found necessary, and this frictional resistance will tend to retard the up and down movement of the vehicle frame with respect to the running gear so as to absorb shocks and jars and prevent excessive rebounding of the vehicle body. The lower closed end 2$^a$ of the telescoping member 2 may be provided with suitable air openings 20 to prevent the interference of atmospheric pressure with the operation of the device.

A modification is shown in Figs. 3 and 4, in which the numerals 21 designate a pair of cylinders which are arranged side by side and rigidly connected to each other in some suitable manner as by means of the bracket 22. A piston 23 is slidably mounted within each of the cylinders 21 so as to move freely up and down within the same, the said piston 23 and cylinders 21 constituting in effect telescoping members. Piston rods 24 are connected to each of the pistons 23 and extend upwardly through the closed upper ends 21$^a$ of the cylinders, the upper ends of the piston rods 24 being slotted at 25 and connected by a pin 26 to which the lower vehicle spring member 27 is attached. Projecting from each of the cylinder heads 21$^a$ is a housing 28 which surrounds the slotted portion 25 of the piston rod 24. The housings 28 of the two cylinders 21 are connected by a transverse pin 29 which passes loosely through the slots 25 of the piston rods 24, the said pin having the upper vehicle spring 30 attached thereto.

A compression spring 31 which surrounds the piston rod 24 is arranged within each of the cylinders 21 and interposed between the cylinder head 21$^a$ and the piston 23. Fitted against the lower face of each of the pistons 23 is a plate 32 which is provided at the periphery thereof with a spring flange 33 adapted to bear against and frictionally engage the interior walls of the cylinder. This friction member 33 may be longitudinally slotted to provide the spring arms 33$^a$ which correspond to the spring arms 14 of the previously described embodiment of the invention. A second plate 34 is also carried by the piston 23, a packing member 35 being shown in the present instance as interposed between the plates 32 and 34. The periphery of this plate 34 is provided with the downwardly extending spring fingers 36 which have intermediate portions thereof bowed inwardly, the extremities of the spring fingers bearing against the spring arms 33$^a$ to force the same frictionally against the cylinder 21. The piston rod 24 extends downwardly below the piston 23 where it is threaded to receive a frusto-conical nut 37. The inclined side walls of this nut 37 engage the inwardly bowed intermediate portions of the spring arms 36 so that by adjusting the nut upon the piston rod the tension in the said spring fingers 36 can be adjusted as desired. Jam nuts 38 are provided for locking the frusto-conical nut 37 in adjusted position upon the piston rod 24, and similar jam nuts 39 are provided for holding the plates 32 and 34 in proper position upon the piston 23.

In the operation of the device, it will be obvious that as the vehicle body moves up and down with respect to the running gear the piston 23 will be caused to slide up and down or telescope within the cylinders 21. The telescopic movement will, however, be resisted by the frictional engagement of the spring arms 33$^a$ with the cylinder, and the intensity of this frictional engagement can be adjusted through the medium of the nut 37 as may be found necessary. Both forms of the invention thus operate in a similar manner to retard the back and forth movement of the telescoping members and to thereby prevent excessive rebounding of the vehicle body.

Having thus described the invention, what I claim as new and desire to secure by Letters Patent, is:—

1. A shock absorber for vehicles including a pair of slidably-connected members, means for connecting said members with the respective vehicle parts, friction means carried by one of said members and engaging the opposite member, said friction means including an annular member, one extremity of which is fixedly mounted to one of the members and having the opposite extremity terminating in bowed-spring fingers frictionally engaging the other of said members, and means for adjusting the tension of the spring fingers.

2. A shock absorber for vehicles including a pair of slidably connected members, means for connecting the said members with the respective vehicle parts, friction means comprising a cylindrical part provided with a series of spring arms carried by one of said members and engaging the opposite member, spring fingers engaging the said friction means and formed with a bowed portion, and means engaging the bowed portion of the spring fingers to regulate the tension therein.

3. A shock absorber for vehicles, including a pair of slidably connected cylindrical members, means for connecting the said members with the respective vehicle parts, a cylindrical part terminating in a plurality of spring arms carried by one of the said members and frictionally engaging the opposite member, spring fingers engaging the said spring arms, and means for adjusting the tension in the spring finger to increase or decrease the friction.

4. A shock absorber for vehicle parts including a pair of slidably connected members, means for connecting said members with the respective vehicle parts, a spring arm, one end of which is fixedly mounted upon one of said spring members, said spring arm being bowed intermediate of its extremities and a free extremity of said arm being in frictional engagement with the other member, and means engaging the bowed portion of the spring arm to regulate the tension thereof.

5. A shock absorber for vehicles including a pair of slidably connected members, means for connecting the said members with the respective vehicle parts, an annular series of spring arms carried by one of the members and engaging the opposite member, an annular series of spring fingers engaging the said spring arms, and means for adjusting the tension in the said spring fingers.

6. A shock absorber for vehicles including a pair of slidably connected members, means for connecting the said members with the respective vehicle parts, an annular series of spring arms carried by one of the members and engaging the opposite member, an annular series of spring fingers engaging the spring arms and formed with bowed portions, and a nut member mounted for engagement with the body portions of the spring fingers so that the tension of the said spring fingers can be regulated.

7. A shock absorber for vehicles including a pair of telescoping members, means for connecting the said members with the respective vehicle parts, an annular series of spring arms carried by one of the telescoping members and frictionally engaging the opposite telescoping member, an annular series of spring fingers engaging the said spring arms and tending to force the same into operative position, and means for adjusting the tension of the spring fingers to decrease or increase the frictional action of the spring arms.

8. A shock absorber for vehicles including a pair of telescoping members, means for connecting the said members with the respective vehicle parts, an annular series of spring arms carried by one of the telescoping members and frictionally engaging the opposite telescoping member, a collar mounted upon the first mentioned telescoping member and formed with spring fingers which engage the spring arms and are formed with bowed portions, and an adjusting nut threaded upon the collar and adapted to engage the body portions of the spring fingers to regulate the tension thereof.

9. A shock absorber for vehicles including a pair of hollow telescoping members, a spring mounted within the hollow telescoping members, means for connecting the said telescoping members with the respective vehicle parts, an annular series of spring arms carried by one of the telescoping members and frictionally engaging the opposite telescoping member, a series of spring fingers carried by the first mentioned telescoping members and engaging the spring arms, the said spring fingers being formed with body portions, and an adjusting nut adapted to engage the bowed portions of the spring fingers to regulate the tension thereof.

10. A shock absorber for vehicles including a pair of telescoping members, means for connecting the said members with the respective vehicle parts, one of said members being provided with an annular series of spring arms for frictional engagement with the opposite telescoping member, said first telescoping member also carrying an annular ring provided with a series of spring members which bear upon and engage the spring arms with tension and adjusting means carried by said first telescoping member for adjusting the tension of the spring members.

11. A shock absorber for vehicles including a pair of slidably connected telescoping members, means for connecting said members with the respective vehicle parts, friction means associated with one of said members, and imparting frictional resistance toward movement of the telescoping members, said friction means including an annular series of spring members, the free ends of which constitute frictional bearing devices, and means for adjusting the degree of frictional adherence between the annular series of friction devices and the coöperating telescoping member.

HENRY C. HEBIG.

Witnesses:
WILLIAM P. HAMMOND,
IRENE MULCAY.